Dec. 17, 1968  J. R. BREY  3,417,370

SEISMIC VELOCITY CORRELATION

Filed Dec. 23, 1966  2 Sheets-Sheet 1

INVENTOR
JAMES R. BREY

D. Gene Richards
ATTORNEY

United States Patent Office 3,417,370
Patented Dec. 17, 1968

3,417,370
SEISMIC VELOCITY CORRELATION
James Robert Brey, Irving, Tex., assignor to Texas Instruments Incorporated, Dallas, Tex., a corporation of Delaware
Filed Dec. 23, 1966, Ser. No. 604,434
6 Claims. (Cl. 340—15.5)

ABSTRACT OF THE DISCLOSURE

Related seismic traces with differential horizontal offset are cross-correlated in pairs where the traces in each pair with greatest offset are corrected successively for normal moveout where different selected values of seismic velocity is the variable in the correlation. A resultant velocity correlation function has a maximum amplitude at a velocity which is an index to the actual velocity of the formations through which the seismic energy on said traces has passed.

FIELD OF THE INVENTION

This invention relates to seismic exploration and more particularly to the determination of seismic velocities from reflection seismograms. In a more specific aspect, the invention relates to a nonlinear cross-correlation between one or more pairs of seismic traces wherein the correlation variable is velocity for production of cross-correlation function which serves as an index to the actual velocity of the section through which the seismic waves travel.

DESCRIPTION OF THE PRIOR ART

In seismic exploration records are secured on which coherent reflected energy from subsurface reflecting horizons appears on a suite of seismic traces. That is, a coherent pattern in the character of the traces ordinarily is apparent at each of a plurality of successively increasing record times. Such seismic records are secured at a plurality of spread locations in a given area so that the relative depths of the reflecting subsurface horizons can be estimated.

It is desirable not only to be able to estimate relative changes in the depth of a given horizon, but to know the absolute depths. Heretofore, seismic data has been processed to avoid misinterpretations of the subsurface structure. It has thus become normal practice to obtain velocity information in the area in which a given seismic record is obtained so that the depth of the various reflecting horizons can be determined from the reflection times apparent on the seismogram.

The determination of seismic velocity heretofore has been carried out by lowering a seismic detector or geophone into a deep well drilled in the region in which the seismic exploration is being conducted. Such a well must be as deep as the deepest point of interest in the geologic section. Such geophone is positioned at each of a plurality of successively shallower depths and while at such depths, detects a seismic pulse generated at the earth's surface. A plot is then made of the one-way travel-time versus depth. From this, the seismic velocities of the various sections can be determined.

Such operations are dependent upon the existence of a well. Since seismic exploration is employed for reconnaissance as well as detailed mapping of the subsurface, a well generally is not available at the desired location. Thus, it has become necessary to secure the velocity information by other means.

Papers by C. H. Dix, Geophysics, 1955, vol. 20, pp. 68–86, by C. H. Green, Geophysics, 1938, vol. 3, pp. 295–305, and by A. W. Musgrave, Geophysics, 1962, vol. 27, pp. 981–993, describe other methods that have been heretofore employed.

The most common technique for the determination of seismic velocities from reflection seismograms currently employed is by arc of the "$X^2-T^2$ velocity profile." Green (1938), Dix (1955) and Musgrave (1962) discuss various aspects of this method in detail. Briefly, however, this prior art method involves visually picking the reflection arrival times $T_{X_i}$ at a number of offset $X_i$ from an expanding spread velocity profile. The arrival times and their corresponding offsets are then squared and plotted with $T^2$ as the ordinate and $X^2$ as the abscissa. Assuming no corrupting factors exist to affect the visual picking of the reflection times such as noise, near surface statics, dip and ray curvature, the points will fall on a straight line on a $T^2-X^2$ graph. The reciprocal of the slope of this line is $\overline{V}^2$ and the intercept on the $T^2$ axis is $T^2_v$. However, due to the presence of some or all of the above corrupting factors, the points will in general not lie on a straight line and some type of linear curve fit to the points has been employed usually by the method of least squares.

There are a number of disadvantages and weaknesses to this prior art $X_2-T_2$ method. Extremely large offsets are involved in shooting a velocity profile which result in a poor signal-to-noise ratio thus subjecting the visual reflection picking to greater inaccuracies. Also, a least square curve fit weighs each point equally and the presence of a few severely erroneous time picks can introduce considerable error when trying to solve for both $\overline{V}$ and $T_v$ simultaneously as in the $X^2-T^2$ analysis.

The present invention differs from and provides an improvement over such prior methods. It is based upon a nonlinear velocity correlation. More particularly, where seismic traces are obtained in a given area with different source-detector spacings, the time differentials in the occurrences of a reflection as it appears on such traces are uniquely dependent upon the seismic velocity. Heretofore where such traces have been treated, corrections have been made for the differences in geometry, i.e., the differences in spacing between the shot and the detectors which will be referred to herein as differential horizontal offset. Such corrections commonly known as normal moveout (NMO) corrections, are made to conform with the well-known relationship.

$$T_X = \sqrt{T_V^2 + \frac{X^2}{\overline{V}^2}}$$

where:
$T_X$ is the apparent reflection time,
$T_v$ is the corrected reflection time,
$X$ is the horizontal offset or source-detector distance,
$\overline{V}$ is the average propagation velocity of the seismic energy from the source to the reflection point and back to the surface.

Representative prior art systems for carrying out such NMO corrections are described in U.S. Patents 3,077,573 to Wendenburg, 3,092,805 to Koeijmans, and 3,223,966 to Lindsey. Such operations, however, require knowledge of the velocity.

SUMMARY OF THE INVENTION

The present invention is directed toward determination of the velocity by utilizing the unique properties which permit corrections for normal moveout. More particularly, in accordance with the present invention, the velocity down to a first reflector indicated by a reflection on two related traces is obtained by effectively correcting for normal moveout one of said traces over a given signal gate therein which includes a reflection from such reflector. Such corrections are based on each of a plurality of different selected velocities. The corrected data gate is cross-correlated with an uncorrected trace having a different geometry. The variable in the cross-correlation is velocity. The resultant cross-correlation function will have a positive maximum which is indicative of and provides an index to the actual velocity of the section through which the reflection thus cross-correlated passes.

Such an operation preferably is carried out for each of a plurality of pairs of traces and for each of a plurality of time gates located at successively increasing record times. The velocity correlation functions for the different pairs of traces are summed or stacked to provide high resolution. The use of signal gates spaced along the record provides a velocity profile in terms of velocity vs. depth.

DESCRIPTION OF DRAWINGS

For a more complete understanding of the present invention and for further objects and advantages thereof, reference may now be had to the following description taken in conjunction with the accompanying drawings in which.

DESCRIPTION OF PREFERRED EMBODIMENTS

FIGURES 1-3

Figure 1:
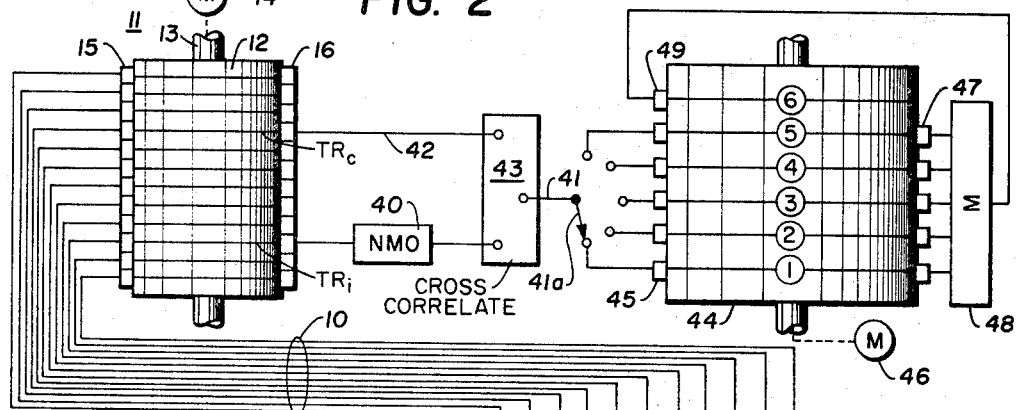
FIGURE 1 illustrates the operation of the present invention to traces obtained in the same seismic spread.
Figure 1:
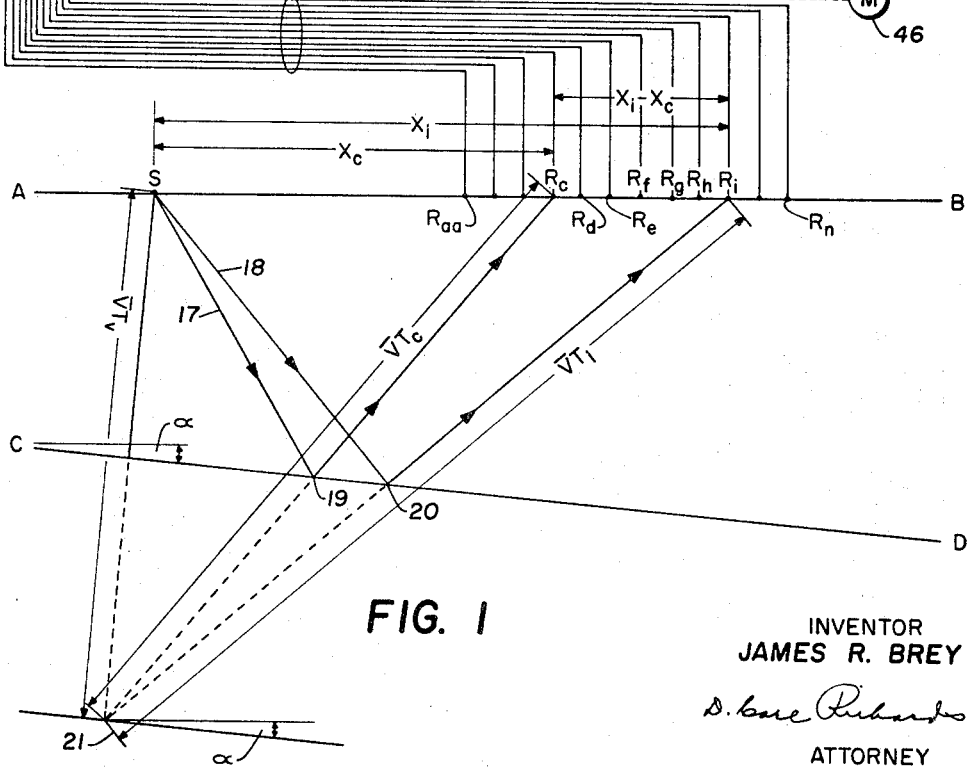

FIGURE 1 illustrates an exploration system and the ray path geometry for a single fold seismic reflection recording operation. Single fold operations differ from common depth point operations. In single fold operations one ray path from a source location leads to each reflection point on a reflecting horizon. In multi-fold coverage as in expanding spread operations energy from several shots is detected after reflection from the same subsurface reflection point.

In the single fold operation of FIGURE 1, a source location S on the line AB marks the site at which seismic waves are generated for travel downward to subsurface reflecting horizons such as the horizon C–D. A plurality of geophones including geophone $R_c$ and $R_i$ are planted on the surface AB so that the seismic waves generated as by detonation of a charge of dynamite at point S may be detected. The energy released at point S propagates through the medium and is reflected from the interface C–D which is dipping at an angle ($\alpha$) to the earth's surface. The reflected energy is sensed by the geophones, converted into electrical signals, and applied by way of channels 10 to a recording system 11 which may include a drum 12 mounted on shaft 13 and driven by motor 14. A plurality of recording heads 15 serve to store the signals as separate traces on the drum 12. Twelve such traces are shown. The traces may be stored in analog form. They are reproducible as through the use of reproducing heads 16. Alternatively, they may be sampled and recorded on magnetic tape as a conventional digital seismic record of the type described in Foote et al. Patent 3,134,957.

The signals recorded on traces $TR_c$ and $TR_i$ are connected by way of channel 42 and NMO unit 40, respectively, to a correlation unit 43. The correlation unit 43 has an output selector 41a in output channel 41, which serves to apply the correlation signal output to a recording head 45 on a multi-track drum 44. The drum 44 is driven by motor 46. The selector 43 may be actuated to apply the correlator output to any one of tracks 1–5. Playback heads 47 lead to a summation unit 48, the output of which is connected to a recording head 49 for storing a summation signal on track 6 of drum 44.

For the purpose of the present description, the seismic wave is assumed to leave the source S and propagate along straight line ray paths. Hence a constant average propagation velocity $\overline{V}$ may be assumed for the ray paths, such as paths 17 and 18. The energy traveling a long ray paths 17 and 18 is reflected from points 19 and 20 respectively, and thus appears to originate at a source point 21.

Due to differential horizontal offset between any two geophones with respect to the source S, the reflected energy arrives at the two geophones at different record times. For example, the detector $R_c$ is located a distance $X_c$ from the source S. The detector $R_i$ is located a distance $X_i$ from the source S. Thus, the differential horizontal offset between detectors $R_c$ and $R_i$ is equal to the distance $X_i - X_c$.

Figure 2:
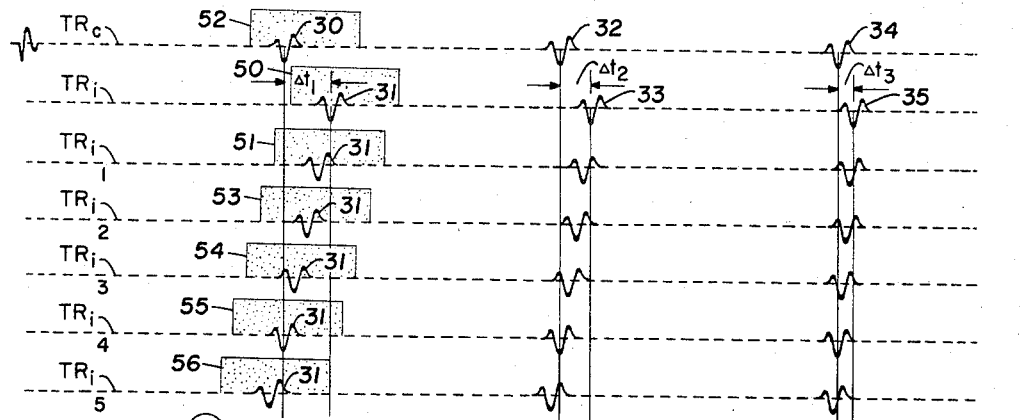
FIGURE 2 illustrates various wave forms involved in the present invention.

Because of this differential horizontal offset, a reflection 30, FIGURE 2, from point 19 will appear on trace $TR_c$ at a time earlier than the reflection 31 from point 20, which appears on trace $TR_i$. Similarly, the reflection 32 on trace $TR_c$ may represent reflection energy detected by geophone $R_c$ after travel to and from horizon C–D. The reflection energy 33 on trace $TR_i$ represents the acoustic energy detected by geophone $R_i$ after travel to and from a deeper horizon. Further, reflections 34 and 35 represent energy traveling to and from a still deeper reflecting horizon.

It will be noted that the time interval $\Delta t_1$ between reflections 30 and 31 is greater than the time interval $\Delta t_2$ between reflections 32 and 33, which in turn is greater than the time interval $\Delta t_3$ between reflections 34 and 35. Such time intervals $\Delta t_1$, $\Delta t_2$, and $\Delta t_3$ are due to (1) the difference in the length of the travel paths necessary because of the differential horizonal offset and/or (2) the dip in the beds C–D and successively deeper beds. In prior art practices, normal moveout correction procedures have been and continue to be routinely carried out to eliminate that portion of the time intervals $\Delta t_1$, $\Delta t_2$, and $\Delta t_3$ which is due to the differential horizontal offset. Thus, a normal moveout correction unit 40 may be employed to produce on its output channel a corrected seismic trace $TR_i$ in which the effect of the differential horizontal offset is eliminated. To make such correction properly, however, requires knowledge of the exact average velocity through which the energy traveling along paths 17 and 18 travels.

In order to illustrate the invention in terms most familiar to those involved with conventional NMO operations the relations shown in FIGURE 2 have been included. A window or signal gate from trace $TR_i$ such as the gate 50 is given. A normal moveout correction as in unit 40 to shift the events within the gate 50 nonlinearly, corresponds to the well known normal moveout correction operations. The gate 50, thus nonlinearly shifted may then be cross-correlated (with zero time delay) with a window from trace $TR_c$. The amplitude from this cross-correlation is then registered or stored on track 1 of drum 44. This amplitude may be represented by a point $V_1$, FIGURE 3, where correlation amplitude is plotted versus velocity. More particularly, the trace $TR_c$ is applied by way of channel 42, to correlation unit 43 and the output of NMO unit 40 is applied to the other input of unit 43. Drum 44 may be rotated or moved under control of a stepping motor 46 which drives the drum 44 one step relative to recording head 45 for each selected NMO cycle. The velocity employed for producing the amplitude point for velocity $V_1$ would be the first selected velocity in a series of different velocities selected as follows. The velocity of sound in a section of earth down to the reflection points 19 and 20 will generally be known to be within certain limits. For example where it is known to be somewhere in the neighborhood of 8,000 feet per second, the velocity $V_1$ would be chosen to be well above 8,000 feet per second. As a result of operation of normal moveout unit 40 gate 50 and the reflection 31 therein is shifted to an earlier record time in an amount dependent upon the geometry and the velocity $V_1$.

When a second velocity $V_2$ lower than $V_1$ is employed in the normal moveout unit, the window 50 is shifted farther down the time scale to the position occupied by the window 53 on trace $TR_2$. A still lower velocity $V_3$ shifts the window 50 to the position of window 54. Lower velocity $V_4$ will shift the window to the position of window 55 and a still lower velocity $V_5$ will shift the window 50 to the position of window 56. The shifted window 51 is cross-correlated with a window from trace $TR_c$ with zero lag, i.e.: $\tau=0$.

It will be noted that the reflection 31 is almost in time alignment with the reflection 30 when shifted to the position of window 55. The amplitude of the cross-correlation resulting from exact alignment will be the maximum positive point on the cross-correlation function on track 1. The use of the still lower velocities $V_5, V_6 \ldots V_n$ will shift the window 50 farther down the time scale whereupon the cross-correlation function on track 1 will decrease in amplitude.

When the velocity corresponding with the peak amplitude in the correlation functions is identified, then such velocity is the average velocity of the section through which the reflection 30 traveled.

The foregoing description has involved use of a single trace $TR_1$, applying normal moveout to a given data gate and then cross-correlating the same (with zero lag) with a time gate from trace $TR_c$. This mode of operation is illustrative of the invention. It does not represent the preferred mode of carrying out the invention. More particularly, it has been found that the accuracy of the velocity determination may be enhanced by the inclusion of additional data. That is to say, the results are improved when time gates from each of traces $R_d-R_n$ are corrected for normal moveout for a given velocity, cross-correlated with an appropriate time gate from the signal from detector $R_c$, and then all of the cross-correlation functions are summed. Such is a preferred mode of operation. When such an operation is undertaken the procedure followed is to select a gate such as gate 52, FIGURE 2, which contains a reflection. Thereafter, based upon normal moveout relations, gates from the signals from each of receivers $R_d-R_n$ are selected and such selected gates are then each cross-correlated with the same gate (gate 52) from the signal from detector $R_c$. The correlation functions for such time gates are then summed to produce a summation signal. This operation is set out in greater detail in the following section.

More particularly, when one considers only the two ray paths 17 and 18 leading to geophones $R_c$ and $R_1$, the following relationships apply. The reflected energy arrives at times $T_c$ and $T_1$ to these two receivers respectively. From geometric considerations, a functional relationship which exists between these two times can be expressed as:

$$T_i = \sqrt{T_c^2 - \frac{2T_c(X_i - X_c)\cos p}{\overline{V}}} \tag{1}$$

where $$\cos p = -\left\{\cos \alpha\left(\frac{X_c \cos \alpha}{\overline{V}T_c}\right) + \sin \alpha\sqrt{1 - \left(\frac{X_c \cos \alpha}{\overline{V}T_c}\right)^2}\right\}$$

and $\alpha$ = dip angle, $X_c$ = horizontal offset from shot to geophone $c$,
$X_i$ = horizontal offset from shot to geophone $i$, as $\alpha \to 0$ $$T_i \to \sqrt{T_c^2 + \frac{X_i^2 - X_c^2}{\overline{V}^2}} \tag{2}$$

The method above outlined may be described in more precise terms as follows: between any or all pairs of traces $f(t)$ and $g(t)$ on the seismic record a *velocity correlation* is obtained $$\alpha_n(V_j) = T_c = \sum_{G_0}^{G_{max}} f(T_c) \cdot g(T_i) \tag{3}$$

where $$T_i = \sqrt{T_c^2 - \frac{2T_c(X_i - X_c)\cos p}{V_j} + \frac{(X_i - X_c)^2}{V_j^2}}$$

and $$\cos p = -\left\{\cos \alpha\left(\frac{X_c \cos \alpha}{V_j T_c}\right) + \sin \alpha\sqrt{1 - \left(\frac{X_c \cos \alpha}{V_j T_c}\right)^2}\right\}$$

and $V_j = V_0 - V_{max}$ in $\Delta V$ increments.
$G_0$ = initial gate time on trace $f$.
$G_{max}$ = final gate time on trace $f$.

N correlations from the N pairs of traces preferably are then stacked or summed to produce a composite correlation function:

$$\psi(V_j) = \sum_{\substack{n=1 \\ j=1}}^{\substack{N \\ J}} \alpha(V_j) \tag{4}$$

Average velocity $V$ is then chosen as the $V_j$ which results in the maximum positive value of $(V_j)$. It should be noted here that the *velocity correlations* which are stacked to form the function $\psi(V_j)$ are not limited to all being from the same record. A spatial average from more than one record will tend to reduce the effect of noise and near surface static effects on the velocity determination.

The foregoing steps are repeated at successive time intervals on the record(s) producing a set of average velocities $\overline{V}_k$ as a function of record time. However, for use in collecting for normal moveout, $\overline{V}$ must be known as a function of vertical ray path travel time rather than record time. The maximum amplitude on the correlation function of Equation 4 will not be representative of a vertical path. However, from the geometry in FIGURE 1, record time $T_i$ can be expressed as a function of vertical travel time $T_V$ $$T_i^2 = T_V^2 + \frac{2X_i T_V \sin \alpha}{\overline{V}} + \frac{X_i^2}{\overline{V}^2} \tag{5}$$

Again as $\alpha \to 0$, $$T_i^2 \to T_V^2 + \frac{X_i^2}{\overline{V}^2}$$

In any case for single fold operations the dip angle ($\alpha$) is assumed to be known and $\overline{V}$ is determined as outlined above. The $T_i$'s are made up from the gate centers, i.e., $$\frac{G_{max} + G_0}{2}$$

as specified for the $c$th offset traces $[f(t)]$ in the above-N *velocity correlations* and also from the moveout times corresponding to these gate centers as determined by using $\overline{V}$ for the $i$th offset traces $[g(t)]$ in the N *velocity correlations*. Thus, from the N *velocity correlations* which produce $\psi(V_j)$, there are 2N $T_i$'s determined, some of which are redundant if the same trace is used more than once in the N correlations.

It remains to solve Equation 5 for $T_V$ and this may be done by known methods including the method of least squares with the known constraints on $\overline{V}$ and $\alpha$.

$$T_{V_1} = \frac{-K_1 \sum_{i=1}^{2N} X_i^2 + \sqrt{\left(K_1 \sum_{i=1}^{2N} X_i^2\right)^2 - \sum_{i=1}^{2N} X_i \cdot A_1 \sum_{i=1}^{2N} X_i^3 - \sum_{i=1}^{2N} X_i T_i^2}}{\sum_{i=1}^{2N} X_i} \quad (6)$$

where $$K_1 = \frac{\sin \alpha}{V_1}, \quad A_1 = \frac{1}{V_1^2}$$

In the special case where $\alpha = 0$, $$T_{V_1} = \frac{1}{\sqrt{2N}} \sqrt{\sum_{i=1}^{2N} T_i^2 - A_1 \sum_{i=1}^{2N} X_i^2} \quad (7)$$

Figure 3:
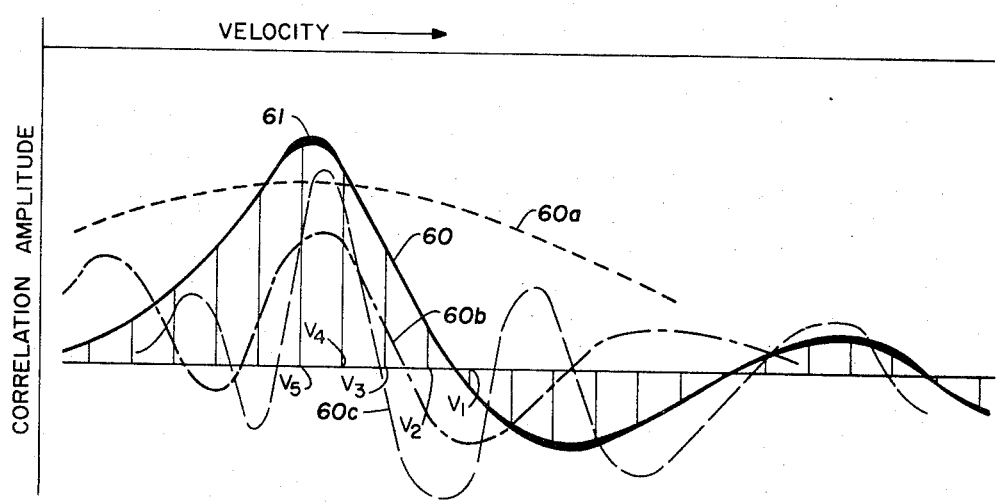
FIGURE 3 illustrates the representative velocity correlation functions.

Referring now to FIGURE 3, it will be noted that there are four curves 60, 60a, 60b and 60c. It has been found that the correlation above described between a single pair of traces may not provide definition as clear or exact as desired. For example the curve 60a is representative of the correlation function obtained by cross-correlating a given gate from trace $TR_c$ with corrected signal gate from a trace representing the output of geophone $R_d$. Thus, where the ray paths leading to the two geophones are not substantially different, then a fairly broad curve, with a peak location difficult to define, is obtained. This is characteristic of curve 60a. Curve 60b represents the same correlation operation but as conducted between traces such as $TR_c$ and $TR_1$ where there is substantial difference in the geometries of the ray paths. Trace 60c provides still further definition and is representative of the result of cross-correlating the signals one corrected and one uncorrected where the greatest spacing available exists between the geophones. Thus, the curve 60c would represent, in a qualitative way, the velocity correlation between the trace from geophone $R_{aa}$ and the geophone $R_n$.

As previously noted, in order to produce a trace having maximum definition, velocity correlation is applied to plurality of pairs of traces. The correlation functions, such as functions 60a, 60b and 60c are then summed to provide a composite correlation function 60. It is characteristic of such a composite function that the side lobes are minimized and the peak such as peak 61 is maximized relative to any of the individual velocity correlation functions.

Figure 4:
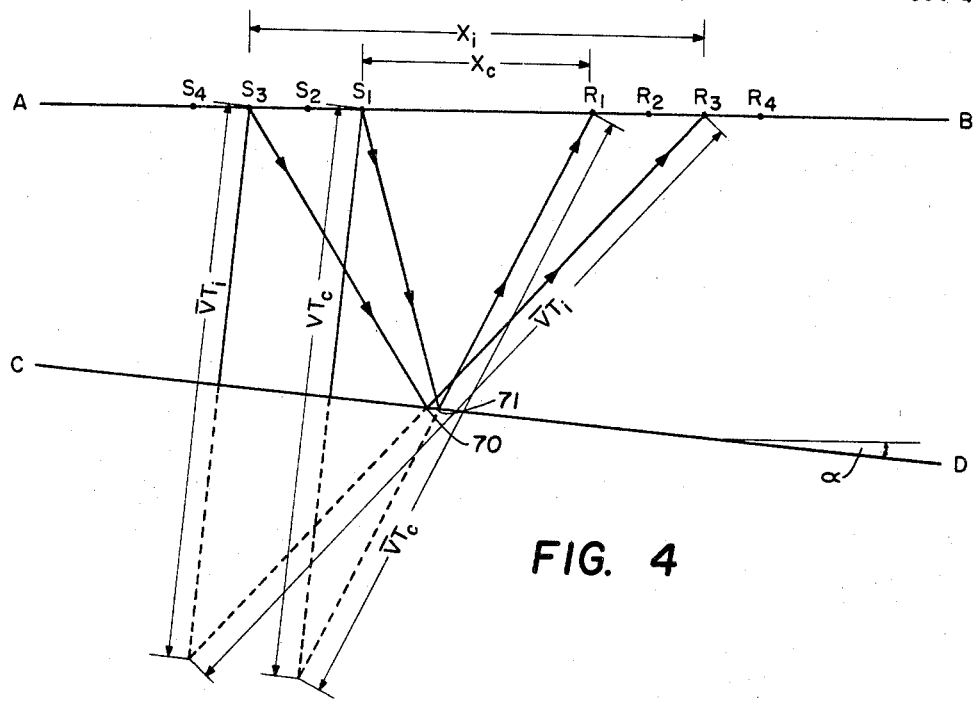
FIGURE 4 illustrates application of the invention to common depth point operations.

If multi-fold common depth point operations are conducted such as illustrated in FIGURE 4, then the dip angle need not be considered. This is because the reflection points such as the points 70 and 71, FIGURE 4, are so close together that error will not be introduced by assuming that points 70 and 71 are actually the same point.

Having described the above operations as applied to single fold seismic operations, it will now be understood that the method may be carried out by following the steps indicated in FIGURE 2. That would involve actually producing a corrected time gate from a second trace of a pair of traces for each of a plurality of different assumed velocities. Thereafter, the shifted time gates would be cross-correlated with a like time gate trace $TR_c$ with zero lag in each correlation. There would thus be produced a single velocity correlation function for each pair of traces. Additional velocity correlation functions would then be obtained by similarly treating traces from detectors $R_d$, $R_e$–$R_n$, each of which might be velocity correlated with like time gates having zero lag taken from trace $TR_c$. The several velocity correlation functions thus produced would be summed or stacked in accordance with Equation 4 to produce a composite output correlation function.

Where the seismic data is recorded as disclosed in the Foote et al. Patent 3,134,957, normal moveout correction operations can be carried out by use of a digital computer thereby avoiding the necessity for conversion of the digitized seismic traces to analog form which would be necessary for use with many prior art normal moveout correction units. Where digital computers are employed to implement the present invention, the operation is expedited by selecting a time gate such as the gate 52 of FIGURE 2 and then identifying and using the proper gate on trace $TR_1$ for cross-correlation with gate 52. Such identification of the gate will be based upon the normal moveout relationships for each of the selected velocities to eliminate the necessity for actually shifting and storing a shifted gate as above described.

For the example given above where the velocity is believed to be around 8000'/sec. the velocities employed in velocity correlation might span the range of from 10,000'/sec. to 6000'/sec. in increments of 50'/sec. In such case there would be eighty points in each correlation curve. Where digital techniques are employed the method has been found to be readily accommodated on an IBM 7040 computer, wherein the operations functionally correspond with and produce results equivalent to those shown in FIGURE 2 wherein cross-correlations for each of the several selected velocities are performed. For most operations, the digital mode is preferred.

The correlations may be carried out in accordance with the operations described in Patent No. 3,023,966 to Cox et al.

Alternatively, the correlation multiplications may be carried out optically as illustrated and described in U.S. Patent 2,696,891 to Neufeld wherein a variable density transparency and a variable area transparency are multiplied. Such operations could be carried out automatically or at least in part by hand as in the Neufeld case to produce velocity correlation curves such as curves 60a, 60b and 60c. From such curves, a composite curve 60 would ultimately be provided either in visual form or in retrievable form from suitable storage.

The determination of velocity from multifold records is the same as that for single fold but the mechanics thereof are slightly modified. That is, the *velocity correlation* is still employed for estimating velocity but its definition is slightly modified.

In FIGURE 4, shotpoints $S_1$, $S_2$ and $S_3$ are located at successively greater distances from the geophone locations which includes the geophones $R_1$, $R_2$, $R_3$, $R_4$. In accordance with well known common depth point techniques, shots are detonated successively at shotpoints $S_1$–$S_4$. Traces taken from four successive seismograms thus would include data traveling along the ray paths leading from shotpoints $S_1$–$S_4$ to the reflection point 70–71 and thence to geophones $R_1$–$R_4$. The data from such traces would then be employed for the velocity correlation operations above described.

Thus FIGURE 4 illustrates the recording and ray path geometry for a 4-fold seismic reflection recording process such as widely used and described and claimed in Patent No. 2,732,906 to Mayne. The four traces formed from receivers $R_1$ through $R_4$ form what is termed a "common depth point" (CDP) set.

From geometric considerations the functional relationship between the reflection arrival times $T_c$ and $T_i$ at any two receiver locations $R_c$ and $R_i$ respectively is $$T_i = \sqrt{T_c^2 + \frac{X_i^2 - X_c^2}{V^2} \cos^2 \alpha} \quad (8)$$

where the terms are defined as previously.

In accordance with this invention *velocity correlations* are obtained between any or all pairs of traces in a CDP set as in Equation 3: i.e.;

$$\phi_n(V_i) = \sum_{T_c = G_0}^{G_{max}} f(T_c) \cdot g(T_i)$$

where $T_i$ is obtained from Equation 8 instead of from Equation 2. As in the single fold case, the *velocity correlations* preferably are stacked to obtain an estimate of $\overline{V}$. It will be understood that the velocity correlation functions or curves which are stacked are not limited to all being from the same CDP set.

As indicated knowledge of dip angle ($\alpha$) is not necessary when the *velocity correlation* is between traces from a CDP set.

In this case $$T_i = \sqrt{T_c^2 + \frac{(X_i^2 - X_c^2)}{(\overline{V}')^2}} \quad (9)$$

and the average velocity obtained from the correlation stack $\overline{V}'$ will be a pseudo velocity and its relation to the true average velocity $\overline{V}$ is $$\overline{V}' = \frac{\overline{V}}{\cos \alpha}$$

The foregoing description has dealt primarily with the determination of the average velocity through the section of earth between the surface A–B, FIGURE 1, and the reflecting horizon C–D. To attain a similar average velocity for the section between the earth's surface and successively deeper reflection horizons, later time gates including reflections such as reflections 32 and 34, FIGURE 2, are selected and the same steps of correcting for normal moveout, cross-correlating and summing the cross-correlation functions for each of a plurality of assumed velocity will be carried out.

Having described the invention in connection with certain specific embodiments thereof, it is to be understood that further modifications may now suggest themselves to those skilled in the art and it is intended to cover such modifications as wall within the scope of the appended claims.

What is claimed is:

1. The method of determining seismic velocity from reflection seismograms on which related traces are characterized by differential horizontal offsets between any two geophones with respect to the seismic source, which comprises:
   (a) cross-correlating signal gates including a signal gate from a first seismic trace with a like signal gate from a second trace where acoustic velocity is the correlation variable and wherein the second signal gate is related to the first signal gate in dependence upon the differential horizontal offset between the point of detection of seismic waves recorded on said first and second traces relative to the location of the source of said waves, and
   (b) registering the amplitudes of the resulting correlation as a function of the velocities employed in said correlations.

2. The method of claim 1 wherein said signal gates are from a plurality of pairs of said traces and are velocity correlated and the resultant correlation functions are summed to produce a composite velocity correlation function the peak positive point of which provides an indication of the average velocity of the earth section through which reflections in said signal gates traveled.

3. The method of determining earth velocity which comprises:
   (a) generating seismic waves at a sending station at the earth's surface,
   (b) receiving said waves at at least two points spaced different distances along said surface from said sending station with one of said points a near point and the other a remote point,
   (c) correcting signal gates including a signal gate from said remote point for normal moveout for each of a plurality of velocities,
   (d) cross-correlating signal gates including the signal gate from said remote point after each said correction with the signal gate from said near point with zero correlation, to produce a plurality of correlation products the maximum of which will occur at the velocity of the section at which said waves traveled to a given reflecting horizon and back to said points.

4. The method of claim 3 in which said waves are detected at a plurality of remote points each differently spaced from said sending stations and wherein gates from each remote point, related in the cross-correlation sense to a selected gate in the signal from said near point, are individually cross-correlated with said selected gate in the signal from said near point for each of a plurality of different assumed velocities and wherein cross-correlation signals for each said assumed velocity are formed to produce a set of summation signals and wherein said summation signals are registered as a function of said assumed velocities.

5. The method of claim 3 in which steps (c) and (d) are repeated for each of a plurality of time gates located at succeedingly increasing times following generation of the seismic waves to provide determination of velocities from the surface to reflectors located at successively increasing depths.

6. A system for determining the velocity of seismic waves which comprises:
   (a) means for producing seismic waves at a sending station at the earth's surface,
   (b) means for detecting said waves at a near station at said surface to produce a first signal,
   (c) means for detecting said waves at a remote station spaced from said sending station a distance different from said near station to produce a second signal,
   (d) means for applying normal moveout corrections to a selected time gate from said second signal for each of a plurality of assumed velocities, and
   (e) means for registering the magnitude of the cross-correlation of said gate with a zero lag gate from said first signal as a function of normal moveout velocity.

References Cited

UNITED STATES PATENTS

| 3,185,958 | 5/1965 | Masterson et al. | 235—181 X |
| 3,217,289 | 11/1965 | Elliot et al. | 340—15.5 |
| 3,217,828 | 11/1965 | Mendenhall et al. | 181—0.5 |

RODNEY D. BENNETT, *Primary Examiner.*

C. E. WANDS, *Assistant Examiner.*